United States Patent [19]
Walker, Jr. et al.

[11] Patent Number: 5,332,436
[45] Date of Patent: Jul. 26, 1994

[54] METHOD OF INCREASING THE SURFACE AREA AND PLASTIC PROPERTIES OF HYDRATED LIME

[75] Inventors: Daniel D. Walker, Jr.; Joseph L. Oliphant, both of Henderson, Nev.

[73] Assignee: Chemical Lime Company, Fort Worth, Tex.

[21] Appl. No.: 42,837

[22] Filed: Apr. 5, 1993

Related U.S. Application Data

[63] Continuation of Ser. No. 753,822, Sep. 3, 1991, abandoned, which is a continuation-in-part of Ser. No. 616,363, Nov. 21, 1990, abandoned.

[51] Int. Cl.$^5$ .............................................. C04B 2/04
[52] U.S. Cl. ................................ 106/792; 106/795; 501/123; 423/640
[58] Field of Search ............... 106/792, 796, 721, 795, 106/657; 501/123, 124; 423/664, 655, 640

[56] References Cited

U.S. PATENT DOCUMENTS

| | | | |
|---|---|---|---|
| 747,689 | 12/1903 | Feely | 106/795 |
| 1,856,763 | 5/1932 | Hemeon | 106/792 |
| 2,409,546 | 10/1946 | Corson | 106/792 |
| 2,437,842 | 3/1948 | Uhler | 106/90 |
| 3,120,444 | 2/1964 | Dunton et al. | 106/119 |

FOREIGN PATENT DOCUMENTS

| | | |
|---|---|---|
| 0177769 | 4/1986 | European Pat. Off. . |
| 283182 | 7/1977 | Fed. Rep. of Germany . |
| 3620024 | 12/1987 | Fed. Rep. of Germany . |
| 2337696 | 8/1977 | France . |

Primary Examiner—Mark L. Bell
Assistant Examiner—C. M. Bonner
Attorney, Agent, or Firm—Charles D. Gunter, Jr.

[57] ABSTRACT

An invention is shown in which a quicklime is hydrated in the presence of a special chemical modifier to produce a controlled temperature hydrate having improved plastic properties and greater surface areas.

6 Claims, 1 Drawing Sheet

METHOD OF INCREASING THE SURFACE AREA AND PLASTIC PROPERTIES OF HYDRATED LIME

CROSS-REFERENCE TO RELATED APPLICATIONS

This application is a continuation of Ser. No. 07/753,822 filed Sep. 3, 1991, now abandoned, which was a continuation-in-part of our earlier filed application, Ser. No. 07/616,363, filed Nov. 21, 1990, entitled Method of Increasing the Plastic Propenies of Hydrated Lime, now abandoned.

BACKGROUND OF THE INVENTION

1. Field of the Invention

This invention relates generally to a method for increasing the surface area and plastic properties of lime, in particular hydrated limes. More specifically, this invention relates to a method of chemically modifying the quicklime hydration reaction with a chemical modifier to bring about a much higher surface area lime hydrate.

2. Description of the Prior Art

Hydrated lime is produced when quicklime (calcium or magnesium oxide) is reacted with water. This reaction is exothermic with approximately 500 Btu/lb quicklime being evolved. Also, the volume of the lime particles increases as much as 94% for CaO and 119% for magnesium oxide. The most likely explanation for the mechanism of the hydration process is that hydration starts at the most active sites of the lime crystal, causing a volume increase and a stress on the crystal. The stresses which occur cause the lime particles to break open further, which allows water to reach additional active sites and continue the hydration process. This activity continues until all the active lime is hydrated. As the active sites on the lime crystals decrease, the hydration activity slows down and the evolution of heat stops.

Higher surface areas of chemicals are known to increase the chemical activity of such chemicals. As a result, higher surface area is an advantage in many applications. For example, where lime is being used for its plasticizing properties, greater surface area allows decreased amounts of lime to be used and still retain the desired degree of workability.

Both relative activity of the quicklime and the temperature of the hydrating water will determine the surface area of the resulting hydrated lime. The chemical activity of hydrated lime is dependent upon particle size, and the smaller the crystal size the greater the surface area of the hydrated lime. Despite the fact that higher water temperature is generally advantageous, one limit on increased temperature is that during the hydration process the water must remain in the liquid state to produce the very small hydrate particles that give high surface areas. Water in the superheated or vapor state (i.e., live steam) produces very low surface area hydrates. Such hydrate produced under uncontrolled temperature conditions referred to herein as "high temperature hydrate" has been found to be denser, quicker settling as a hydrate suspension, less plastic in the form of putty, slower reacting in causticizing processes and in general, inferior to "controlled temperature hydrate" formed under controlled temperature conditions.

This aspect of lime hydration is discussed, for example, in the article "Hydration Control For Production Of Superior Calcium Hydroxide And Hydration Of Magnesium Oxide", Azbe Corporation, February, 1949. The Azbe article discusses a mechanical device and process for controlling the temperature of the hydration water within the reactor vessel. The mechanical apparatus and method of use is difficult and expensive.

It is accordingly an object of this invention to produce a hydrated lime, either high calcium or dolomitic, that is characterized by increased surface area over traditional lime hydrates, in which a chemical modifier is used to control the temperature of the hydration water in order to provide increased surfaces area in the resulting hydrate.

Another object of this invention is to produce a hydrated lime that will increase the lime's ability to hold water and become more plastic.

Another object of this invention is to produce a hydrated lime that can be used in mortars in smaller proportions than used in general practice and still retain the workability required by codes or standards.

Another object of this invention is to increase the hydration reaction of magnesium type, i.e., dolomitic, quicklimes.

Another object of the invention is to provide a modifier for a dolomitic quicklime which catalyzes the magnesium hydration reaction to less than one hour from a normal 24 hour reaction rate.

Another object of this invention is to provide a method of producing dolomitic hydrated lime suitable for mortars without having to use pressure methods of hydration.

Another object of this invention is to provide a method of producing a very high surface area hydrated lime slurry that can be located near a fossil fuel boiler plant and provide a highly active acid gas sorbent for spray scrubbers.

Another object of this invention is to provide a method of producing a very chemically reactive hydrated lime slurry that can be located near process chemical plants, such as recaustisizing operations, and provide such slurries for chemical processes.

Another object of this invention is to provide a hydrated lime that will increase the mortar life of pre-mixed mortars, such as called "ready mix mortars", in which an additive is mixed with mortar mixes to delay the set time of the mortar for one to two days.

Another object of this invention is to provide a hydrated lime that will reduce the amount of the special additive used in ready mix mortars.

SUMMARY OF THE INVENTION

The method of the invention produces an improved lime hydrate characterized as having surface areas in excess of 20 $m^2/g$ and as having crystals in the shape of thin, flat platelets rather than lumpy and uneven aggregates. The method includes the steps of combining water and quicklime in a slaking operation to thereby form a lime hydrate, the step of combining the water and quicklime producing an exothermic chemical reaction which, in turn, produces a heated water of hydration. The slaking operation is carried out in the presence of a chemical modifier selected from the group consisting of ethylene glycol, diethyleneglycol, triethylene glycol, monoethanolamine, diethanolamine, triethanolamine and mixtures thereof, the chemical modifier being present in an amount effective to control the heat of the heated water of hydration sufficiently to prevent the formation of steam, whereby a hydrated lime particle results having a particle size in the range from about 0.2 to 0.35 microns and having a surface area in excess of 20 m²/g.

The method of the invention can be used to increase the plastic properties of hydrated lime, particularly hydrated, dolomitic limes. Thereafter, the hydrated quicklime can be used to form an improved mortar suitable for building purposes by forming a blend of the hydrated dolomitic quicklime with portland cement, sand and water.

Additional objects, features and advantages will be apparent in the written description which follows.

DETAILED DESCRIPTION OF THE INVENTION

Figure 1:
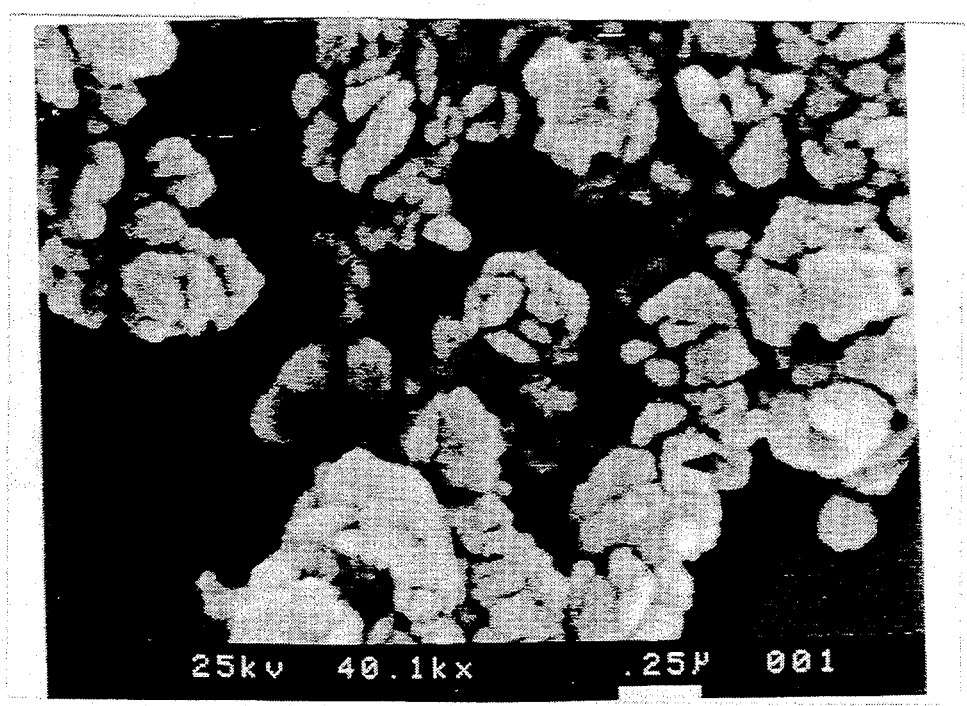
FIG. 1 is a scanning electron microscope photograph of a high temperature hydrate produced according to the prior art method.

As is well known in the arts, quicklime (either high calcium lime, CaO, or dolomitic quicklime, CaO+MgO) can be hydrated by slaking with water, the reaction being accompanied by the evolution of heat. The special hydrated quicklime taught by this invention is made by introducing a special chemical modifier to the quicklime before hydration, or to the water of hydration, in order to provide a hydrate produced under controlled temperature conditions, thereby increasing the surface area of the resulting lime hydrate.

Highly active, high surface area hydrated limes can be produced according to the principles of the invention. Thus, either high calcium quicklimes or dolomitic quicklimes can be utilized in the practice of the invention, depending on the end application for the resulting product. High calcium quicklimes have greater than 90% calcium oxide, with less than 5% magnesium oxide and minor amounts of inert materials. Dolomitic quicklimes generally have from about 35 to 50% magnesium oxide with the remainder being calcium oxide and a minor amount of impurity. The high calcium hydrates provide high caustic values for chemical reactions in neutralizing acidic compounds. The smaller magnesium crystals provide greater workability than calcium crystals, making dolomitic quicklimes well adapted for use in building materials such as mortars. These quicklimes are well known to those skilled in the art and are commercially available from a number of sources.

The slaking water that is employed in the method of the invention may be any of the water from economical and normally employed sources. Preferably, the water will not have a high concentration of materials that will react with the quicklime used to form the hydrated limes of the invention.

The preferred chemical modifiers useful for the purposes of the present invention are selected from the group consisting of amines and glycols. Particularly preferred additives are selected from the group consisting of ethylene glycol, diethyleneglycol, triethyleneglycol, monoethanolamine, diethanolamine, triethanolamine and the mixtures thereof. The most preferred additive is triethanolamine.

As mentioned above, when calcium or dolomitic quicklimes (i.e. the oxides) react with water, a large amount of heat is evolved. This heat is manifest in two ways, 1) the overall heat of the system, i.e., the general temperature of the hydrator vessel; and 2) the heat in the heart of the lime particles themselves, i.e., the temperature prevailing within the lime particles and particle masses. The overall heat of the system seldom rises above about 100° C. However, the heat at the reactive lime crystal sites can be much higher and often exceeds 100° C., causing the temperature of the hydration water at the active sites to exceed 100° C. When the temperature of the hydration water at the active sites goes above 100° C., hydration is carried out in a steam atmosphere. Crystal growth and agglomeration occurs which results in larger particle sizes, denser product, rapid settling suspensions and less plasticity. The end result is a poor plasticizing and low surface area hydrated lime.

The present invention involves the discovery that, if the temperature of hydration can be made more uniform throughout the hydration system, especially at the oxide crystal sites, a smaller hydrated lime crystal will result with higher surface areas. As discussed, previous attempts to control the temperature of the water of hydration generally involved keeping the internal temperatures in the reaction vessel below critical levels with very low temperature hydration water. These attempts have involved complicated mechanical devices to cool the water in the reaction vessel and such processes generally worked less than satisfactorily and were expensive to implement.

In the present invention, a special chemical modifier is used during the slaking operation in an amount which is effective to control the temperature of the hydration water within a desired range so that the reaction proceeds at a more controlled rate, whereby the lime hydroxide crystals are allowed to form at a slower rate, without the disrupting hydration energies of high temperature steam hydration. The inventive mechanism for controlling the hydration temperature thus involves the chemical delay of the hydration process by blocking the highly active oxide sites which react with water and evolve heat. The mechanism is a chemical mechanism as opposed to the mechanical cooling devices of the prior art which attempted to provide low temperature hydration water to the reactor vessel.

The process of the invention is carried out by contacting the chemical modifier with the quicklime during the normal slaking operation, typically in a non-pressurized reaction vessel. The order of adding the ingredients is not critical. For instance, it is possible to add the chemical modifier to the water and then to use the water for slaking the quicklime or to slake the quicklime which has previously been coated with the chemical modifier. It is necessary to use proper proportions of chemical modifier and quicklime to achieve the desired controlled temperature hydrate. In the case of the "putty-lime" of the invention it is also necessary to maintain a slaking water to lime ratio such that the resulting hydrated lime is in a "putty" state. For example, the percent solids of the putty should be maintained between about 40% and 55%, most preferably between about 48% and 52%.

A study was made to determine the reaction rate of quicklime and water with and without the use of a chemical modifier as revealed by this invention. An ASTM slaking rate test was made with quicklime and water in accordance with ASTM C-110 which will be familiar to those skilled in the art. The quicklime was treated with approximately 4.0% by weight triethanolamine, based on the total weight of quicklime. Note that while it is the internal temperature at the active crystal sites which is ultimately to be controlled, that the rise in temperature of the slaking water in the reactor vessel can be correlated to the desired controlled temperature condition. We have found that where the temperature rise in the heated water of hydration within the reactor vessel is kept below about 82° C. in four minutes of elapsed time that a controlled temperature hydrate results.

The results shown in Table I indicate that quicklime treated with the chemical modifier had a slower reaction rate than quicklime untreated, and the reaction continued over a longer period of time and reached a higher temperature. These results confirm the mechanism of the reaction, as previously mentioned, in that the chemical modifier attached to the active sites of the quicklime and blocked water from reacting. However, as the slower reacting sites begin to react with the water, stress cracks of expansion open up the quicklime crystals and allow the reaction to continue. In the case of dolomitic quicklime, the chemical modifier was surprisingly found to catalyze the reaction of water and magnesium oxide, extending the reaction until the magnesium oxide had completely hydrated. Without the use of the chemical modifier, the reaction of magnesium oxide is delayed because the hydration of MgO to $Mg(OH)_2$ is a function of time and temperature, and the less active sites are not subjected to uniformly high temperatures for equivalent time periods.

TABLE I

| | Temperature Rise ASTM C-110 Slaking Rate Test | |
|---|---|---|
| Time, min. | Rise, (°C.) no modifier | Rise, (°C.) with modifier |
| 1 | 78 | 54 |
| 2 | 81 | 59 |
| 3 | 82 | 68 |
| 4 | 82 | 80 |
| 5 | 82 | 82 |
| 10 | 80 | 84 |
| 15 | — | 87 |
| 20 | — | 90 |
| 25 | — | 92 |
| 30 | — | 94 |

In another test the surface area of the resulting hydrates was measured, the quicklime being treated with various amounts of chemical modifier. The percentages of modifier are percent by weight, based on the total weight of quicklime being treated. The results are given in Table II.

TABLE II

| BET Surface Area Measurements of High Calcium Hydrates | |
|---|---|
| % Chemical Modifier | Surface Area ($m^2/g$) |
| 0.0 | 30.0 |
| 1.0 | 45.0 |
| 2.0 | 54.8 |
| 4.0 | 56.7 |

Using the special chemical modifier technique of this invention, surface areas were nearly doubled, which is very significant for faster and more efficient chemical reaction rates.

Figure 2:
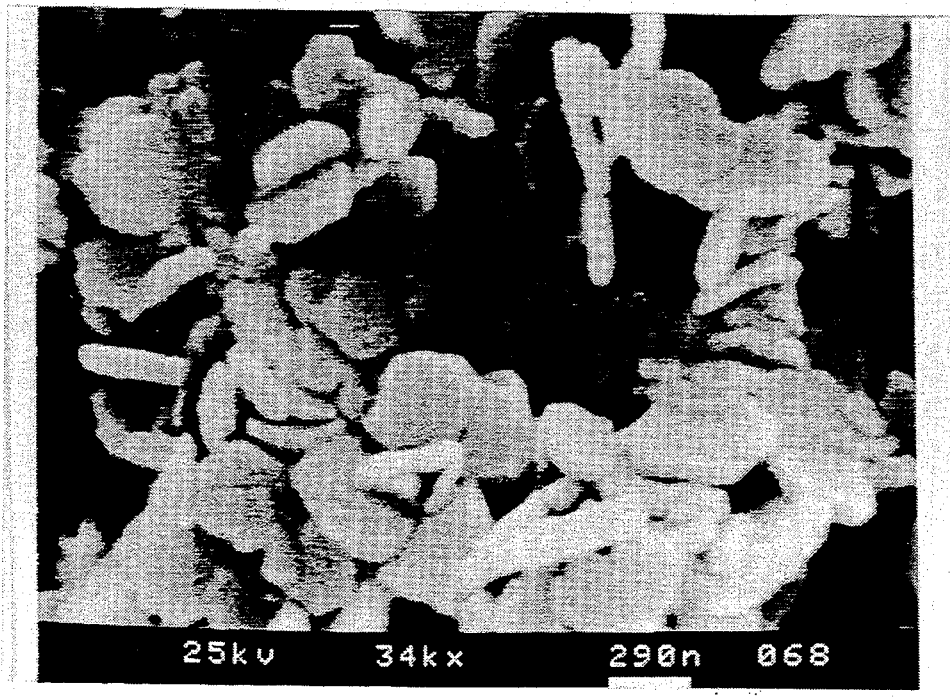
FIG. 2 is a similar photograph of a controlled temperature hydrate of the invention.

FIGS. 1 and 2 are scanning electron microscope photographs which show the different sizes and shapes of hydrated lime particles using the techniques of the prior art and using the chemical modifier technique of the invention. The hydrated lime crystals made according to the prior art (FIG. 1) are agglomerated into particles of about 0.3 to 0.5 microns in diameter. They are also lumpy and uneven in shape, and will not dissociate into individual particles. Their plasticizing abilities would be inferior since they would not slip and slide around each other, nor hold significant amounts of lubrication water.

By contrast, the hydrated lime particles made according to the method of the invention (FIG. 2) have crystals which are slightly smaller than the prior art (0.2 to 0.35 microns), and the crystal shapes are dramatically different. They are thin, flat platelets that would slip and slide very efficiently, resulting in improved plasticizing characteristics.

The modified hydrated lime of the invention can be used as is for chemical reactions or diluted with additional water to produce a thin slurry, as desired, for better handling or metering. A slurry can be stored in holding tanks for long periods of time with very little agitation, because of the high surface area and slow settling rate.

In order to demonstrate the improved properties of the lime hydrates of the invention, a specific end use—that of a construction mortar—will be discussed in detail. Lime is used in mortars (mortars for the purpose of this invention are any combination of portland cement, plasticizing agents, sand and water) because of its plasticizing ability to provide workability, or the ability to form or shape the mortar easily and efficiently into any desired shape. For masonry, the mortar must stay pliable on the mortar board for long periods of time (60 minutes plus) and to be spreadable on masonry units without becoming stiff for several minutes. This requirement will allow the mason to spread the mortar for lengths of 10 to 15 feet and still be plastic so that a proper bond will occur.

In the case of mortars used in plastering, the mortar must remain plastic and workable while being pumped long distances (300 to 600 feet) in small diameter hoses (2 to 4 inches in diameter) without sand segregation, stiffening, or otherwise causing the mortar to plug the mortar flow.

Generally, plasticizers are such materials as hydrated lime, clay mixtures, organic compounds, such as cellulose products, or air bubbles formed from soap or other type chemicals that are made specifically to create air bubbles when the mortar is mixed with water.

Mortars are blended in rotating mixing devices in which water, portland cement and sand are mixed to the desired consistency according to the mason's preference for the application. A plasticizing agent is also used, preferably hydrated dolomitic lime. The proportions of the ingredients used in mortars most generally are those as designated by codes or specifications. For example, Standard C-270 of ASTM specifies mortars by Types, these being M, S, N, or O. Each Type of mortar is specified to meet a specific narrow range of proportions or by a compressive strength requirement. These Types are shown in the following Table:

| Typical Mortar Mixes, ASTM C-270 Proportions by Volume | | | | |
|---|---|---|---|---|
| Mortar Type | P. Cement | Lime | Sand | % Lime |
| M | 1 | ¼ | 3½ | 3.2 |

-continued

Typical Mortar Mixes, ASTM C-270
Proportions by Volume

| Mortar Type | P. Cement | Lime | Sand | % Lime |
|---|---|---|---|---|
| S | 2 | 1 | 9 | 5.2 |
| N | 1 | 1 | 6 | 8.0 |
| O | 1 | 2 | 9 | 10.9 |

Mortar Types by Property

| Mortar Type | Unconfined Compressive Strength, psi |
|---|---|
| M | 2500 |
| S | 1800 |
| N | 750 |
| O | 350 |

It should be pointed out that as the percent lime increases in a mortar, the workability increases; however, at the same time, the compressive strength decreases. Therefore, the greater the plastic power of hydrated lime, the less can be used. Using less lime in a mortar will increase the compressive strength.

Board lime of mortar is important to the mason. It is important that the mortar remain workable long enough for the mason to apply the mortar to the masonry units and place them before the mortar stiffens because of water loss to evaporation or any premature setting of the portland cement. Any ingredient introduced to a mortar that would cause premature setting, whether from an additive or due to an impurity in the mortar ingredients would be very detrimental.

Workability of a mortar is measured by the amount of water the mortar will retain after applying a vacuum suction. Such a test method is described in ASTM Standard C-91, called the Water Retention Test Method. The ASTM mortar Standard C-270 requires mortars to have a minimum of 75% water retention. An excellent lime plasticizer can give a mortar a water retention value in the 90% range. A poor plasticizer, resulting in a mortar with a water retention value below 75%, gives a mortar difficult to work and the loss of bonding strengths.

If used in mortars the "putty" can be added directly to the mortar mixer and blended with portland cement, sand and water. The mixing can be carried out according to established practice using the guidelines previously referred to in ASTM mortar Standard C-270 and ASTM Standard C-91, the disclosure of which is hereby incorporated herein by reference. As will be demonstrated, the specially treated "putty" hydrated lime can be used in a mortar mix at about 30 pounds (50% solids) putty to replace 50 pounds dry, untreated hydrated lime.

In contacting the lime, chemical modifier and slaking water according to the teaching of the present invention, the ratio of slaking water to quicklime is preferably between about 2.0:1 and 3.0:1 and, most preferably, is between about 2.4:1 and 2.7:1 so that a resulting "putty" lime will have a percent solids of about 50%. The weight ratio of chemical modifier to quicklime useful for purposes of the present invention is between about 0.003:1 and 0.040:1, most preferably between about 0.004:1 and 0.010:1. At these ratios the hydrated lime is in the "putty" state of about 50% solids.

The controlled temperature lime hydrate of the invention can then be blended with portland cement, sand and water to make the mortar compositions of the invention. The mixing can be carried out according to established practice using the guidelines previously referred to in ASTM mortar Standard C-270 and ASTM Standard C-91, the disclosure of which is hereby incorporated herein by reference. As will be demonstrated, the specially treated hydrate can be used in a mortar mix at about 30 pounds putty to replace 50 pounds dry, untreated hydrated quicklime.

The following examples are intended to be illustrative of the invention, without being limiting in the scope thereof. An example of the effectiveness of the hydrated lime produced by the techniques of this invention is as follows:

Using the water retention test method as outlined in ASTM C-91, mortars were made using portland cement, lime, sand and water. Decreasing amounts of treated lime were used and water retention values were determined. Table III indicates the amount of lime in mortar mixes in which the portland cement and sand were maintained at percent levels, with only the lime content being changed.

TABLE III

Workability of Plastic Mortars
Water Retention Method

| Trial No. | Dry Lime Pounds* | Water Retention % | Putty** Pounds*** | Water Retention % |
|---|---|---|---|---|
| A. | 50 | 86 | 15 | 90 |
| B. | 37.5 | 81 | 11¼ | 88 |
| C. | 25 | 70 | 7½ | 85 |
| D. | 12.5 | 59 | 3¾ | 76 |

*Commercial dry hydrated lime.
**Indicates treated hydrated quicklime of the invention.
***Based on weight of dry solids in putty.

Notice that in Trial A with only 15 pounds of dry lime in the putty the water retention was higher than 50 pounds of dry lime hydrate. Also, notice in Trial D with only 3¾ pounds of lime in the putty the water retention was above the ASTM Standard C-270 requirement for an acceptable mortar, and the commercial dry lime at 25 pounds did not meet the requirement.

Measuring the relative viscosities of hydrated dolomitic lime as produced by this invention, it has been shown that in a test method of measuring the viscosity of slurries produced with the same water to lime ratio, and other conditions held constant, the hydrate without additive had a viscosity of about 300,000 centipoise. A hydrate made according to this invention had a viscosity of 1,500,000 centipoise, an increase of 5 times.

Because of their increased surface area, the lime hydrates of the invention can also be used in other industrial processes, such as in scrubbing acidic gases to remove the acid components before discharging the effluent gases to the atmosphere. In the past, slurry lime particles were generally utilized, since the wet particles had surface areas in excesss of 50 m$^2$/g. The prior art dry hydrated lime particles had surface areas generally below 20 m$^2$/g. Using the method of the present invention, dry hydrated lime particles can be provided having surfaces areas exceeding 50 m$^2$/g. Other end uses for the improved lime hydrates of the invention will be apparent to those skilled in the art.

An invention has been provided with several advantages. The present method increases the surface area of both high calcium and dolomitic hydrated lime, so that the chemical activity is enhanced. The hydrated limes so produced have a greater ability to hold water and become more plastic, and with dolomitic lime the viscosity increased by 500 percent. Hydrated limes made with this invention have very high surface areas so that slurries have little tendency to settle out over long periods of time. Hydrated limes so produced can be manufactured very near to commercial fossil burning boiler plants or manufacturing points of caustic soda from soda ash and provide a very reactive slurry that can be pumped to the production sites. The special additives of this invention increase the hydration reaction of magnesium hydration reaction to about one hour from a normal 24 hour reaction rate. It is not necessary to use pressure methods of hydration to produce the hydrated quicklimes of the invention. Special techniques of pumping quicklime into pressure vessels is not necessary with this invention. The hydrated limes of the invention will not cause "pitting" problems in finished plaster when made according to the process of this invention. The method of the invention can also be used to increase the mortar life of premixed mortars such as called "ready mix mortars." The use of the hydrated lime treated according to this invention will extend the set time of ready mix mortars for one or more additional days.

While the invention has been shown in only one of its forms, it is not thus limited but is susceptible to various changes and modifications without departing from the spirit thereof.

We claim:

1. A method for producing a controlled temperature lime hydrate characterized as having a surface area in excess of 20 m$^2$/g and as having particles in the shape of thin, flat platelets, the method comprising the steps of:

combining water and quicklime in a slaking operation to thereby form a lime hydrate, the water to quicklime ratio being in the range from 2.0:1 to 3.0:1, so that the resulting lime hydrate is a wet product having a percent solids ranging from about 40 to 55%, the step of combining the water and quicklime producing an exothermic chemical reaction which, in turn, produces a heated water of hydration;

the slaking operation being carried out in the presence of a chemical modifier selected from the group consisting of ethylene glycol, diethyleneglycol, triethylene glycol, monoethanolamine, diethanolamine, triethanolamine and mixtures thereof, the chemical modifier to quicklime ratio being in the range from 0.003:1 to 0.040:1, the chemical modifier being present in an amount effective to control the heat of the heated water of hydration sufficiently to prevent the formation of steam, whereby a hydrated lime particle results having a particle size in the range from about 0.2 to 0.35 microns, having a surface area in excess of 20 m$^2$/g and having particles shaped as thin, flat platelets.

2. A method for producing a controlled temperature lime hydrate especially suited for use as a plasticizer in mortar compositions, the lime hydrate being characterized as having a surface area in excess of 50 m$^2$/g and as having particles in the shape of thin, flat platelets, the method comprising the steps of:

combining water and quicklime in a slaking operation within a hydrator vessel to thereby form a lime hydrate the water to quicklime ratio being in the range from 2.0:1 to 3.0:1, so that the resulting lime hydrate is a wet product having a percent solids ranging from about 40 to 55%, the step of combining the water and quicklime producing an exothermic chemical reaction which, in turn, produces a heated water of hydration, the quicklime including oxide components having highly active oxide sites;

the slaking operation being carried out int he presence of a chemical modifier selected from the group consisting monoethanolamine, diethanolamine, triethanolamine and mixtures thereof, the chemical modifier to quicklime ratio being in the range from 0.003:1 to 0.040:1, the chemical modifier being present in an amount effective to control the heat of the heated water of hydration sufficiently to prevent the formation of steam by blocking the highly active oxide sites and delaying the reaction, whereby a hydrated lime particle results having a particle size in the range from about 0.2 to 0.35 microns, having a surface area in excess of 50 m$^2$/g and having particles shaped as thin, flat platelets.

3. The method of claim 2, wherein the chemical modifier is triethanolamine.

4. A method of increasing the surface area and plastic properties of hydrated lime, the method comprising the steps of:

providing as a starting material a quicklime selected from the group consisting of high calcium lime and dolomitic quicklime;

slaking the quicklime with water in the presence of a chemical modifier, the chemical modifier being selected from the group consisting of ethylene glycol, diethylene glycol, triethylene glycol, monoethanolamine, diethanolamine, triethanolamine and mixtures thereof, the chemical modifier being present in an amount effective to control the heat of hydration sufficiently to prevent the formation of steam; and producing a hydrated lime putty as a result of the slaking, the putty comprising about 40% to 55% solids and hydrated lime particles having a particle size in the range from about 0.2 to 0.35 μm, a surface area in excess of 20 m$^2$/g and shaped as thin, flat platelets.

5. The method of claim 4, wherein the chemical modifier is selected from the group consisting of diethylene glycol, triethylene glycol, monoethanolamine, diethanolamine, triethanolamine and mixtures thereof.

6. The method of claim 4, wherein the chemical modifier is selected from the group consisting of monoethanolamine, diethanolamine, triethanolamine and mixtures thereof.

* * * * *